US011281805B2

(12) United States Patent
Lowagie

(10) Patent No.: US 11,281,805 B2
(45) Date of Patent: Mar. 22, 2022

(54) DISTRIBUTED BLOCKCHAIN-BASED METHOD FOR SAVING THE LOCATION OF A FILE

(71) Applicant: ITEXT GROUP NV, Gentbrugge (BE)

(72) Inventor: Bruno Lowagie, Sint-Amandsberg (BE)

(73) Assignee: ITEXT GROUP NV, Gentbrugge (BE)

(*) Notice: Subject to any disclaimer, the term of this patent is extended or adjusted under 35 U.S.C. 154(b) by 239 days.

(21) Appl. No.: 16/473,115

(22) PCT Filed: Oct. 25, 2017

(86) PCT No.: PCT/IB2017/056624
§ 371 (c)(1),
(2) Date: Jun. 24, 2019

(87) PCT Pub. No.: WO2018/115992
PCT Pub. Date: Jun. 28, 2018

(65) Prior Publication Data
US 2019/0354725 A1   Nov. 21, 2019

(30) Foreign Application Priority Data

Dec. 22, 2016 (BE) .............................. BE2016/5964
Dec. 22, 2016 (BE) .............................. BE2016/5965
Dec. 22, 2016 (BE) .............................. BE2016/5966

(51) Int. Cl.
G06F 21/64       (2013.01)
G06F 16/14       (2019.01)
G06F 21/60       (2013.01)
H04L 9/06        (2006.01)
H04L 9/08        (2006.01)
H04L 9/30        (2006.01)
H04L 9/32        (2006.01)
G06F 21/31       (2013.01)

(52) U.S. Cl.
CPC ............ *G06F 21/64* (2013.01); *G06F 16/152* (2019.01); *G06F 21/31* (2013.01); *G06F 21/602* (2013.01); *G06F 21/645* (2013.01); *H04L 9/0637* (2013.01); *H04L 9/0643* (2013.01); *H04L 9/0891* (2013.01); *H04L 9/3073* (2013.01); *H04L 9/3236* (2013.01); *H04L 9/3247* (2013.01); *H04L 9/3263* (2013.01); *H04L 2209/38* (2013.01)

(58) Field of Classification Search
CPC ........ G06F 21/64; G06F 16/152; G06F 21/31; G06F 21/602; G06F 21/645; H04L 9/0637; H04L 9/0643; H04L 9/0891; H04L 9/3073; H04L 9/3236; H04L 9/3247; H04L 9/3263; H04L 2209/38
See application file for complete search history.

(56) References Cited

U.S. PATENT DOCUMENTS

| | | | | |
|---|---|---|---|---|
| 4,885,777 A * | 12/1989 | Takaragi | ................ | G06Q 20/00 380/30 |
| 5,005,200 A * | 4/1991 | Fischer | ................... | G06F 21/00 380/30 |
| 5,901,229 A * | 5/1999 | Fujisaki | ................ | G07F 7/1016 380/30 |
| 6,938,157 B2 | 8/2005 | Kaplan | | |
| 9,300,678 B1 * | 3/2016 | Stack | .................. | H04W 12/104 |
| 2014/0379585 A1 * | 12/2014 | Buelloni | .............. | G06Q 20/204 705/76 |
| 2016/0212146 A1 * | 7/2016 | Wilson | .................. | H04L 9/3226 |
| 2016/0328713 A1 * | 11/2016 | Ebrahimi | .................. | H04L 9/14 |
| 2016/0330027 A1 * | 11/2016 | Ebrahimi | ................ | G06F 21/34 |

* cited by examiner

*Primary Examiner* — Ayoub Alata
(74) *Attorney, Agent, or Firm* — James Creighton Wray

(57) ABSTRACT

The present invention relates to a computer-implemented method for recording a location of a file by a user in a blockchain; said location comprising one or more location alternatives; said method comprising the following steps: (a) receiving, from said user, at least said file and said location; (b) calculating a file hash based on said file by means of a cryptographic function; (c) optionally, evaluating a uniqueness of said file hash and/or said location and/or a further characteristic with respect to the blockchain, in which a non-uniqueness leads to a corresponding action; (d) composing a location reference comprising said location and said file hash; (e) registering said location reference In said blockchain.

19 Claims, No Drawings

DISTRIBUTED BLOCKCHAIN-BASED METHOD FOR SAVING THE LOCATION OF A FILE

This application claims the benefit of Belgian Application No. BE2016/5964 filed 22 Dec. 2016, Belgian Application No. BE2016/5965 filed 22 Dec. 2016, Belgian Application No. BE2016/5966 filed 22 Dec. 2016 and PCT/EP2017/056624 filed Oct. 25, 2017, International Publication No. WO 2018/115992 A1, which are hereby incorporated by reference in their entirety as if fully set forth herein.

TECHNICAL DOMAIN

The present invention relates to the technical domain of saving a location of a file.

STATE OF THE ART

A problem with the known methods for signing a PDF based document is the need for a central authority for the registration of the signature. A known alternative is the use of a blockchain.

US 2016/0212146 describes systems and methods using a blockchain for recording a file date and for avoiding manipulation, even for documents that are secret and also for those stored in uncontrolled environments. These systems and methods do not require that any confidence is placed in a timestamping authority or a document filing service. A trusted timestamping authority can be used, but even when this timestamping authority loses its credibility or when a third party refuses to recognize the validity of a time stamp, a date for an electronic document can still be specified.

A disadvantage of a method according to US 2016/0212146 is the lack of a mechanism for retrieving the author of a file or document. In terms of document security, this means that the authenticity of a document cannot be retrieved. In the same context, US 2016/0212146 does not offer a provision for non-repudiation, as a result of which an author of a particular file or document can deny the involvement in the realization of the particular file or document at his own discretion.

The present invention aims to find a solution for at least some of the above-mentioned problems.

SUMMARY OF THE INVENTION

In a first aspect, the invention provides a computer-implemented method for saving a location of a file by a user in a blockchain according to claim 1.

First, this method provides a solution for the known problem of reference rot, also known as link rot, by using particular characteristics of the blockchain in a useful way. First of all, such a method advantageously makes use of the characteristics of a blockchain, by allowing a user to incontestably save a link between a file and a location in a decentralized way. As the blockchain also registers the moment of recording in an incontestable way, the location reference is also characterized by an incontestable date. By using a file hash, the file can hereby be identified in a unique way, without necessarily having to disclose the content of the file, which offers further advantages.

The invention offers a solution for the problem of reference rot, in which the provider of a file, i.e. the user, is no longer dependent on the first location, preferably comprising a URL, with which he provides the file. The user can indeed provide a new location for the file, and can record this new link between this existing file and the new location. As each location reference is characterized by a date, a visitor requesting access to the file on the blockchain can easily retrieve the most recently recorded location. Thus, the invention provides a method and a system of persistent locations, in which the file hash acts as file identification. Contrary to related methods of the state of the art, such as a system based on a digital object identifier (DOI), no central authority is involved in the recording and provision of the location of the file, thanks to the advantageous distributed character of the used blockchain. Each file can easily be retrieved in the blockchain via its file hash. For an obsolete location, where no file can be found anymore, it can also be retrieved which file or which files have ever been linked. Also, there are provisions for authenticity and non-repudiation, thanks to the signing of the hash-related string by the user. In a preferred embodiment, the hash-related string concerns the file hash, in which, by signing, the user recognizes having access to the file. In another embodiment, the hash-related string relates to a combination of the file hash and the location, in which, by signing, the user recognizes that the file and the location are mutually linked.

Further advantages of the invention relate amongst other things to the recording of a precise date of disclosure of a file, allowing an integrity control, and retrieving historical data with respect to a file. These advantages have been described elsewhere in the present document.

In a preferred embodiment, said location comprises several different location alternatives, in which each of said several location alternatives preferably comprises a corresponding URL. In such an embodiment, the invention provides mirror locations, resulting in equivalent locations for the file. In case of several URLs, a visitor desiring access to the file, for example is granted a faster access, or a more robust access. A faster access is for example obtained when the URLs correspond to several physical download locations spread all over the world, as a result of which it becomes possible, whether automatically or not, to choose the download location that is physically most nearby. A more robust access is obtained if one of the locations is inaccessible temporarily or permanently, for example because of problems relating to the network or a firewall blocking certain domains for certain visitors, but the other locations do remain accessible.

In a second aspect, the invention provides a method for confirming a validity of a location reference that has been recorded with the method for recording a location of a file according to the present invention by a validating party, said method comprising the steps:

(A) receiving a location reference of a file, said location reference comprising a location, a signed hash-related string that has been signed by a user, a user identity with respect to said user, and a file hash, said location comprising one or more location alternatives, said signed hash-related string being constructed based on at least said file hash and preferably further based on said location;

(B) processing said user identity for retrieving a public key belonging to a key pair belonging to said user;

(C) decrypting said signed hash-related string with said public key that has been obtained in step (B), resulting in a decrypted hash-related string;

(D) optionally, evaluating a validity of said decrypted hash-related string that has been obtained in step (C) with respect to said file hash that has been received in step (A);

(E) retrieving a copy of said file for each of said one or more location alternatives;

(F) calculating a file hash for each copy that has been retrieved in step (C);

(G) evaluating a being equal of the file hash that has been received in step (A) and each file hash that has been calculated in step (F);

in which said confirmation of said validity takes place if said evaluation in step (G) is positive, and optionally if said evaluation in step (D) and step (G) are both positive. In a preferred embodiment, this method comprises the following further steps:

(H) if said evaluation in step (G) is positive, and optionally if said evaluation in step (D) and step (G) are both positive, composing a location reference ready for validation comprising at least said location, said signed hash-related string that has been signed by the user, said file hash and a validating party identity for retrieving said validating party public key;

(I) signing by said validating party of said location reference ready for validation, for obtaining a validating location reference;

(J) optionally, adding said location reference of said user to said validating location reference if not yet included in said validating location reference;

(K) registering said validating location reference in said blockchain;

in which said signing in step (I) comprises encrypting a validating string with a public key of a validating party that belongs to a validating party key pair of a validating party, and in which said validating string comprises at least said hash-related string that has been signed by the user.

The advantage of such a method is that it allows to check in a reliable, and preferably automated way the correctness of the recorded location, including possibly several location alternatives. This form of validation can moreover be carried out several times. Hereby, the different validating parties sign a validating string that comprises at least the hash-related string that has been signed by the user. In a preferred embodiment, the different validating parties can moreover sign the validating string that has been signed by a preceding validating party "in series". Such a method has been described in Example 2. Depending on the importance of the file, the number of validating parties can be equal to 0 if not important, and can then increase if more trust must be placed in it. In a preferred embodiment, the choice of validating parties is made arbitrarily, in an alternative embodiment, the choice of validating parties is determined by a kind of "subscription" of the user at a trusted validating party. This is somewhat similar to the subscription that users/companies have at a Timestamp Authority. In such a case, the trusted validating party provides a service that is paying or not to act as validating authority.

In a third aspect, the invention relates to a system for recording a location of a file by a plurality of users, said system comprising a plurality of mutually linked devices, each of the devices comprising a processor, tangible non-volatile memory, instructions in said memory for controlling said processor, a client application, in which for each device, the client application is configured for carrying out a method according to the present invention, in which a user identity for retrieving a public key for at least one of the users is linked one-to-one to the client application on the device belonging to said user.

Such a system has amongst other things the advantage that a strongly controllable environment is created, allowing to take fast action in diverse situations, such as the case of a compromised HSM.

In a fourth aspect, the invention relates to a use of the method of the present invention in a system of the present invention.

In another aspect, the invention provides a use of a blockchain comprising a plurality of location references recorded with the method of the present invention and preferably recorded by the system of the present invention as file location index, in which a search query comprising a file hash and/or a metadata field and/or a first ID belonging to said metadata field and/or a second ID belonging to said metadata field results in the search of said plurality of location references that have been saved in the blockchain, resulting in a provision of a location reference recorded in the blockchain associated with said search, preferably a location reference that has been recorded most recently in the blockchain associated with said search query.

The advantage of such a use is that the blockchain realizes a user-friendly and transparent inventory of locations of files, i.e. a file location index. In this way, a search query can for example be carried out very easily on the file hash, in order to find out in this way if the file has been registered, what the location is, and if there are any problems, such as for example in case more references are present in the blockchain with mutually different authors or locations. A similar advantage can also be realized by using a unique file ID, as described in the present document. In a related way, a simple search for files of a particular user can immediately provide a whole list of references to anyone having access to the blockchain.

In a further aspect, the invention relates to a use of a blockchain comprising a plurality of location references recorded with the method of the present invention and preferably recorded by the system of the present invention as link index, in which a search query comprising a location concerning a URL to scan results in the searching of said plurality of location references that have been saved in the blockchain, resulting in a provision of an indication of the fact whether or not said link has been registered in the blockchain and/or file-related information based on a location reference related to said location and/or validation-related information based on a validating location reference related to said location.

In such a use, the blockchain is advantageously used as a user-friendly and transparent inventory of locations, in which it can be checked very easily which files have been provided at a particular location. The integrity of individual locations can also be checked.

According to another aspect, the invention relates to a use of a blockchain comprising a plurality of location reference recorded with the method of the present invention and preferably recorded by the system of the present invention as event trigger, in which an event relating to the recording of a location reference meeting one or more filtering criteria related to a user, a location, a file hash and/or a metadata field of a file forms a trigger for generating a notification related to said event.

Such a use is advantageous for the systematic inventory of files and file versions by third parties, that can use the information that has been written to the blockchain as a trigger for updating their inventory. An example of such a third party is a search engine realizing web crawling, an archiving service saving historical versions of files such as web pages, or a specialized service sending notifications to subscribed users based on certain search criteria and/or filters.

In a fourth aspect, the invention relates to a computer program product for carrying out a computer-implemented method of the present invention, preferably in a system of the present invention, which computer program product comprises at least one readable medium in which computer-readable program code portions are saved, which program code portions comprise instructions for carrying out said method.

Further preferred embodiments of the present invention will be described in the detailed description and the claims.

DETAILED DESCRIPTION

The invention relates to a digital "file". It can for example be a PDF-based document, but it can also be any other format for word processing or word display, but it can also be an image (either pixel-based, or vector-based), a media file such as an audio fragment or a film fragment, a JSON file (JavaScript Object Notation), or a specialized file format such as for example a computer aided design (CAD) file. It can also be about any web page that is offered online, such as for example the "default page" of a certain web domain, often having the file name "index.html", but also possibly relating to another page, corresponding the webserver directory index. Here, it can be the actual html file, but also a derivative, such as the media query conscious version of the file and/or a media query conscious file, such as described in this document. Another example of a file is a PDF-based document. This is a digital file based on the "Portable Document Format" file format, preferably meeting the specification ISO 32000-1:208 (PDF 1.7) and/or the specification ISO-32000-2:2017 (also known as PDF 2.0). The category of PDF based document comprises all PDF documents, but also all other files comprising portions of code relating to the PDF standard. Below, you will find a non-limiting list of examples. A first example of a PDF based document is a PDF document. A second example is a PDF portfolio, a container format that is appropriate for comprising several PDF files and related data. A third example is an XFA file (XML Forms Architecture), a mark-up language in which a dynamic form is made in XML (eXtensible Markup Language), but in which the XML code is compressed and saved in a PDF file. Such a XFA file can be processed by PDF processors supporting the XFA specification. A fourth example is a successor or variant to the present PDF file format, of which the aim is similar to that of the present PDF file format.

In this document, the term "location" refers to a location reference of a file, i.e. to the identification of the place where the file is available. Hereby, it is about a file that can be presented as byte string and that can be saved on any known physical support. In a preferred embodiment, it is about an electronic access path to the file, and the file is made available on a medium that can easily be read out in an electronic way, such as a flash memory, a hard disk drive or tape. In an alternative embodiment, the location describes a physical address or a coordinate, e.g. a series of GPS coordinates, of a library, depot or any other saving location of the file, in which the file is saved on any physical support, including a print on paper. The location can comprise one or several location alternatives. In a preferred embodiment, each location alternative is a uniform resource identifier (URI), more preferably a URL, and the location relates to a list of mutually different URLs. In this context, the acronym "URL" refers to a uniform resource locator, a structured name referring to the location of a file. A URL comprises amongst other things a protocol name and a domain name. Preferably, it is about a location that is available on the internet, as is typically the case for protocols such as http, https, in which the URL relates to a web address. It can also be about other types of locations that are also available via the internet, as is typically the case for the protocol ftp. Furthermore, a location that is available on the internet, can also be available via another protocol, such as for example BitTorrent or related peer-to-peer protocols, for which the location is typically specified in a separate file such as a ".torrent" file. In another possible embodiment, the file is available via URL, but the URL is not necessarily publicly available. Here, it is about a URL that is available for visitors of said URL having the permissions to consult the file. In such an embodiment, certain credentials are for example necessary for having access to the file. Examples of credentials are: the combination of a user name and a password, a certificate. Also, the condition that one tries to make a connection with the URL via a particular intranet, can result in a kind of selective access. It is here for example about a URL that is only available within an intranet, and that is not available outside.

In this document, the term "user" refers to the initiator for the recording of the location of the file. This can both be a person assisted by a machine and a machine autonomously/automatically recording it.

In the context of the present document, a user ensures the recording of a location of a file. The user can hereby be in a special relation to the file, e.g. he can be the author, but does not necessarily have to be it.

In the present document, the term "hash" refers to a second bit string that is obtained by having a cryptographic hash function act upon a file, that is a first bit string. The terms "hash function" and "hashing algorithm" are hereby equivalent. For being significant, this hash function has to convert the long first bit string into a (much) shorter second bit string. Furthermore, the chance that the hash already figures as a hash of another file, must be very low, so that the hash can be a useful form of unique "finger print" of the file. This "finger print" is usually referred to with the term "message digest". It should also be impossible to reconstruct portions of the original file from the obtained hash, i.e. the hash function should be "one-way". In a preferred embodiment, the cryptographic hash function is thus a function meeting all of these criteria, such as an algorithm belonging to the family of Secure-Hash-Algorithms (SHA), such as for example SHA-256. Hereby, it should be noted that the possibility of a non-unique hash cannot be excluded theoretically; when two files correspond to the same hash after separate application of the same hash function, this is called a "hash collision". In a preferred embodiment of the present invention, the invention comprises provisions for taking into account this possibility. In an embodiment, the problem of hash collision is prevented by checking for such a hash collision in step (c) and adapting a metadata field for avoiding such a hash collision. In another embodiment, hash collision is avoided by the use of a supplementary hash. In such an embodiment, said file hash does not only comprise a first hash, but also a supplementary hash that is different from said first hash, in which both are obtained in step (b). Hereby, the first hash and the supplementary hash can for example be obtained from the same file, but can be calculated with two mutually different cryptographic hash functions, such as SHA-256 and SHA-512. In a possible embodiment, said supplementary hash can be used for avoiding potential problems with hash collision, by using not only the hash as obtained in step (b), but also the combination of this hash with the supplementary hash as a file hash. In another embodiment, the uniqueness of the combination of the file hash and the file ID pair ensures that problems with hash collision are avoided.

In the present document, the terms "public key" and "private key" refer to aspects of Public Key Infrastructure (PKI). PKI is used for recording the identity of a person or organization. PKI comprises the use of a key pair comprising two keys:
- a private key that must be kept secret by the owner of the private key. This private key is typically saved on a Hardware Security Module (HSM) and/or smart card and/or USB token and/or similar device of which it cannot be retrieved;
- a public key that can be shared with the world, and comprises information about the owner.

The private key can never be retrieved based on the public key, they form a pair because a message that has been encrypted with the one key can only be decrypted by means of the other key. In the context of the present invention, such a key pair is used for signing a hash-related string. By signing this with the private key, it is possible for a receiver of the encrypted hash to retrieve the original hash-related string, by using the public key, which, in a method of the present invention, can be retrieved based on the user identity. If such decryption is successful, then nobody else than the owner of the private key can encrypt the hash-related string. The user can have his public key registered at a Certificate Authority, as a result of which his key pair gets an official character.

In the context of this document, the terms "file" and "document" are interchangeable.

In the document, the term "blockchain" refers to a distributed database keeping a continuously growing list of registrations in blocks, which are specified incontestably, are kept up to date and cannot be adapted. In the context of the present document, the registrations relate to document references; in the known case of bitcoin, the registrations relate for example to transactions. The database is saved and maintained at a multitude of nodes, that each separately take part in the calculations that are necessary for expanding the list of registrations. It is inherent to the design of the blockchain that none of the nodes make adaptations to the existing list of registrations, that, when recording, a time or "time stamp" is associated to each of the registrations. Strictly speaking, these adaptations are possible, but only provided that a majority of the calculation represented force in the nodes "conspires", which becomes more improbable as the blockchain gets larger and knows more users. Because of the advantageous characteristics, a blockchain can serve as "distributed ledger".

In the present document, the term "web-of-trust" refers to a decentralized cryptographic model and related distributed system for relating in a reliable way a public key to a user, and by extension, considering a user identity as being reliable. In an embodiment of a web-of-trust of the present invention, a particular user identity is reliable if a sufficient number of user identities already belonging to the web-of-trust consider the particular user identity as being reliable. Hereby, said number can be considered as sufficiently large if it exceeds a predefined number.

"A", "an" and "the" refer in the document to both the singular and the plural form unless clearly understood differently in the context. "A blockchain" means for example one or more than one blockchain.

As said before, the invention provides a solution for avoiding reference rot, also known as link rot. When a company for example changes its domain name or renews a website, this is typically accompanied with a change in the locations of the files that have been made available. In the example of a website, it can be a modified URL because the domain name has been changed. In another example, it can be a new content management system, in which the path of the internal structure of a website changes, as a result of which also in such a case, the URL of files changes. If a provider of files does not do anything, visitors to the original URL only see an error message. In an approach of the state of the art, this problem is solved by a redirect, in which the old URL redirects to the new URL. Such an approach is however problematic, because it slows down the website. Another problem is that in this way, the visitors still use the old URL, possibly with an old name of the organisation of the provider of files processed into it, which is often not desired. Another important problem is that the files cannot be provided in a reliable way in this way. The web browser which visitors use, does indeed typically allow only a limited number of redirects. Depending on the web browser, the user sees an error message "too many redirects". For the provider of the files, it is however not always possible to know for which links this message is shown. By saving the link between file and location in the blockchain, the most recent location can always be found.

Another advantage of the invention relates to the incontestable assignment of a date on which a file has been made public. It can for example be desired that a univocal time of publication of a file is recorded. By recording a location reference, it is possible for a third party as from the moment of recording to verify if the link is valid and if the file is available. Such verification can be done manually, but, according to a further aspect of the invention, it can also be automatic. This allows to date in a very precise way when a file is made available. This has important advantages for example in case of a patent-related survey of the state of the art, in which the files relate to prior art documents, and in which the date of disclosure plays a crucial role. For judging the patentability of a concept, it should indeed be known for all documents that are known in the state of the art when they have been made public, and this preferably precise up to the date. Known methods relate to web tools such as the Wayback Machine (http://archive.org). Such an archive is however incomplete, but is, despite its incompleteness, still consulted often, because it still gives an indication as to the date of a document. With a recording of the present invention, the user chooses to also disclose a location in the blockchain, as a result of which this user, e.g. an author or an editor, indicates that the file is made public. In some cases, this is to the advantage of the user: the earlier the date of disclosure of the file, the earlier it is clear that the intellectual property linked to the file belongs to the author of the file. It can however also be disadvantageous: when someone erroneously makes a file public, he or she creates an ineradicable trace to that disclosure, which, in case of for example patentability, corresponds to a disclosure that is detrimental to novelty.

In a further preferred embodiment, said blockchain is publicly available. This has the additional advantage of an increased transparency. For users, it allows them to publicly provide the list of files that are signed by the user within the secure context of the present invention. For receivers and consumers of files, it provides a useful instrument for verifying the integrity, authenticity and non-repudiation of a particular file, without any restrictions as to the access to the blockchain.

In another preferred embodiment, said registration takes place in step (e) provided that said user identity and furthermore optionally said identity of the validating party belongs to a plurality of user identities that have been registered in a web-of-trust, or that the user identity is known to a Certificate Authority. This has the advantage that location references in the blockchain already comply with a certain quality mark when specifying them. This preferred embodiment is preferably associated with the use of a blockchain that is adapted for recording location references of files, rather than a blockchain that has already been used for another aim such as the bitcoin blockchain.

In a preferred embodiment, said web-of-trust is at least partially registered in said blockchain. Such an embodiment has the advantage that no separate model should be used for the web-of-trust, which improves the simplicity. Moreover, the web-of-trust has in this way the known advantages of the blockchain, allowing irreversible, incontestable and distributed recording of the user identity related data, including timestamping.

In another preferred embodiment, said location comprises a location alternative concerning a URL providing access to a visitor to the file if said visitor disposes of a permission to consult said file. Such an embodiment allows a user in an advantageous way to disclose the existence and the location of a file, without necessarily disclosing the whole content of the file. In another preferred embodiment, the URL offers the possibility to have access to the file, for example by entering a user name and a password. Preferably, the URL also offers unconditional access to other file information relating to the file. In a preferred embodiment, the file information is limited to some fields such as author, location, date of publication, and this is included in the location reference. In an alternative embodiment, the further file information is extended, with fields relating to for example several authors, biographies and source material. In such a case, the further file information is saved externally of the blockchain, and the location reference preferably also comprises the location of this further file information, and the file information hash linked to this file information. In a preferred embodiment, this file information hash and/or the location of the further file information is also added to the hash related string that is signed in step (d).

In another preferred embodiment, said method comprises step (c) comprising the evaluation of the uniqueness of said location with respect to the blockchain; in which the non-uniqueness leads to a corresponding action comprising the testing of said location. This is advantageous because in this way, it can be avoided that for one and the same location, two different files have been registered erroneously.

In another preferred embodiment, said file comprises a metadata field; in which said method comprises step (c) comprising the evaluation of the uniqueness of said file hash with respect to the blockchain; in which the non-uniqueness leads to a corresponding action comprising adapting said metadata field and resuming the method as from step (b) with the resulting changed file for obtaining a changed file hash that is unique with respect to said blockchain.

In such an embodiment, by verifying the uniqueness, the problems of a possible hash collision are avoided. In a related preferred embodiment, one ensures that new registrations for files that have already been registered, can only be done by users disposing of the necessary permissions.

According to another preferred embodiment, said file comprises a metadata field; in which said method comprises step (c) comprising the evaluation of the uniqueness of another characteristic with respect to the blockchain, said further characteristic relating to said metadata field; in which the non-uniqueness leads to a corresponding action comprising adapting said metadata field and resuming the method as from step (b) with the resulting changed file for obtaining a changed metadata field that is unique with respect to said blockchain, and in which said location reference build in step (d) comprises said metadata field. This has the advantage that files can get a unique identification at registration in the blockchain. In related further preferred embodiment, said file relates to a PDF-based document, in which said metadata field relates to a file ID pair comprising of a first ID and a second ID; in which said file ID pair preferably relates to an ID array corresponding to ISO 32000-1 and/or ISO 32000-2 and/or PDF 2.0 comprising a first byte string concerning a first file identifier and a second byte string concerning a second file identifier, in which said ID array is not encrypted independent of the fact whether or not a portion of said file has been encrypted; in which said first ID concerns a permanent ID for identifying an original version of said file; in which said second ID related to a changing ID for identifying an adapted version of said file; in which said evaluation in step (c) relates to the evaluation of the uniqueness of said file ID pair with respect to the blockchain; in which the not-uniqueness leads to a corresponding action comprising adapting said second ID and resuming the method as from step (b) with the resulting changed file for obtaining a changed file ID pair that is unique with respect to said blockchain; and in that said location reference composed in step (d) comprises said file ID pair.

Such an embodiment advantageously uses the standards which PDF-based documents meet. Concretely, the standards ISO 32000-1 (optional) and ISO 32000-2 (compulsory) require that documents must dispose of an ID array that is not encrypted and is thus directly readable, even if the content of the actual document is encrypted. Moreover, the standard requires that the ID array must comprise a first and second ID, in which the first ID should be generated arbitrarily. This first ID serves as a reference for creating a 'family' of documents, in which the first version of a document relates to one or several more recent versions of the same document, because they have one and the same first ID in common, while the second ID varies for each version. The standards hereby assume that it is possible to use the first ID as a unique identification, while no mechanism for verification is available according to the state of the art. Contrary to this, the present invention allows to check via the blockchain if a first ID is unique with respect to the blockchain, and in this way to use this standardized field effectively as a unique identification. The same goes for the second ID, that can also be chosen in such way that the whole file ID pair only corresponds to one single file and one particular file hash. In a preferred embodiment, the document ID pair can be chosen in such way that as to aspects of notation such as length and allowed characters, it corresponds to already existing notations for document ID pairs. In an alternative embodiment, the first document ID can be chosen equal to the hash belonging to an earlier version of the relevant document, whether or not combined with parts of a user identity, and/or the second document ID can be chosen equal to the "new" hash belonging to the relevant document. This offers advantages as to the traceability of documents. This preferred embodiment is preferably also combined with the use of a chainblock that is specifically adapted for the signing of PDF based documents.

In a further preferred embodiment, said private key is saved on a hardware security module (HSM) and/or smart card and/or USB token and/or similar device. This reduces the risk of theft of the private key.

In a preferred embodiment, a replacement of said key pair belonging to said user by a new key pair belonging to the same said user comprises a registration on said web-of-trust. This has the advantage that said web-of-trust can group the files of one and the same user under one and the same user identity, with larger simplicity as a result.

In a preferred embodiment, said blockchain at least partially overlaps with the technology of the bitcoin blockchain. This has the advantage that an existing system can be further developed. As a result of the nature of the blockchain, in which data can be adjusted inappropriately if a majority of the calculation force represented in the nodes "conspires", it can be advantageous to make use of a similar large blockchain as the bitcoin blockchain. In a large blockchain, it is indeed very improbable that a majority of the calculation force is taken over by an attacker.

In a further preferred embodiment, said cryptographic hash function belongs to the family of Secure-Hash-Algorithms (SHA), such as for example SHA-256. The algorithm has the advantage that it has been proven and that efficient algorithms are available for carrying out hashing.

In a further preferred embodiment of a system of the present invention, at least one of said plurality of devices comprises a hardware security module and/or smart card and/or USB token and/or similar device. This has the advantage that the risk of theft of the private key is limited.

In another preferred embodiment of a system of the present invention, the recording of a location reference occurs in a blockchain provided that said user identity belongs to a plurality of user identities that have been registered in a web-of-trust or at a certificate authority; in which the fact that the user identity linked to the client application is compromised, leads to the removal of said compromised user identity from said plurality of user identities that have been registered in said web-of-trust or at said certificate authority. This leads to a larger a better organization of said web-of-trust.

In a further preferred embodiment, the file relates to a media query conscious file, that can optionally relate to a media query conscious version of the original file. Such a media query conscious version is characterized by the absence of non-constant elements such as today's date, an advertisement, etc., in which the file is reduced as much as possible to the actual content, and is thus typically smaller than the size of the original file. In a preferred embodiment, the media query conscious file relates to a separately generated file; in an alternative embodiment, it relates to one or more portions that are taken from the original file. This has the advantage that the update of a date or the modification of an advertisement does not lead to an adaptation of the actual file, as a result of which the hash of the file for example only changes when the actual content of the file changes. In an exemplary embodiment, the original file is a web page, for which a media query conscious version is provided. In an embodiment, this can be a printable version of the file that is provided via cascading style sheets (CSS), such as for example known by the skilled worker under the term "print.css". Another possible embodiment relates to file content that is offered via a RSS feed (rich site summary), in which updates of online content are offered in a simple, standardized and computer-readable format. In another embodiment, said file relates to a media query conscious file format such as XML (extensible mark-up language), allowing human-readable content and machine-readable content to be placed in the same file. In a preferred embodiment, said media query conscious file is a file that is stored in a media query conscious format based on CSS, for example based on a "responsive web page" characterized by the code portion "@media". In an alternative embodiment, the original file and/or the media query conscious file relate to a PDF-based file having a responsive character, such as the so-called "next generation PDF" initiative that is now being developed. For such a PDF-based file with responsive character, it becomes easier to extract and/or identify media query conscious portions, and to cut time-dependent portions such as a date or an advertisement, or to simply neglect them when calculating a hash in the context of the present invention.

Another advantage of the method of the present invention is that there is no need for a Timestamp Authority (TSA) controlling the attribution of time stamps, which is typically the case in a method of the state of the art. The use of such a TSA is thus unnecessarily complex.

Another advantage of the present invention is that location references are collectively available, so that anyone having access to the blockchain, can see details about the used type of hash function and/or PKI encryption and/or technique for signing. If a particular technique is known not to be considered as trustworthy any more, large groups of users can immediately be informed about it, and by extension, they can be encouraged to "renew" the signature of their existing files by means of another, more secure technique. It can also be easily verified if this "renewal" is actually carried out. Such a large-scale problem identification is inconceivable in a case in which a central authority is responsible for the link between files and their locations, such as the case for Digital Object Identifiers (DOIs).

In the following, the present invention is described based on some non-limiting examples, for illustrating the invention in particular embodiments.

EXAMPLE 1

Method and System for Recording a Location of a File

This example supposes a system of the present invention. The system comprises a plurality of said devices, called SYSTEM entities here, that are mutually connected via a network such as the internet. Each SYSTEM entity comprises a CLIENT component and an HSM. The CLIENT component corresponds to said client application and can for example be built in a document management system that is available on the SYSTEM entity and/or a web browser that is available on the SYSTEM entity. The user identity, called IDENTITY specification here, is used to identify the person or the company that possesses the CLIENT component, the HSM and the SYSTEM entity. Said web-of-trust or series of registration at a certificate authority comprises each IDENTITY specification. For said web-of-trust, an IDENTITY specification is for example only trusted if it presents itself at the web-of-trust and is approved by a sufficient number of other IDENTITY specifications that are present on the web-of-trust, such as companies that know and trust each other. The web-of-trust is for example used when an HSM must be replaced or when the key pair on the HSM has expired, or because the encryption-algorithm used in combination with the key pair must be updated. At a registration at a certificate authority, the user should at least be registered, and similar other conditions can be imposed.

The files are in this example made public via locations each comprising at least two location alternatives. All location alternatives relate to URLs. Each CLIENT component maintains a copy of the BLOCKCHAIN database composed of blocks, corresponding to said blockchain. Each block in the BLOCKCHAIN database comprises a list of location references, with for each of them a file hash and diverse location alternatives. Each block in the BLOCKCHAIN database further comprises the corresponding hash-related strings, and information about the user comprised in the user identity. The BLOCKCHAIN database itself is public, and the location of the files is also public.

Whether the content of the files is pubic, is a choice of the respective providers of the files. The URL of a file can for example directly give access to the content of the file, but it is also possible that only partial information about the file is displayed, and that an authentication should take place for full access, e.g. with a password and/or a captcha and/or a possibility to log in. As to the possible distribution of files, it is thus the providers of the files that decide. The signed hash-related string is hereby called SIGNATURE, and is registered in combination with the location of the file and the IDENTITY specification registered in the BLOCKCHAIN database. Hereby, the combination of SIGNATURE, location, file hash and IDENTITY specification corresponds to said location reference.

The location reference provides a unique and incontestable proof of the location of said file at the time of recording. In a preferred embodiment, the system comprises provisions that prohibit that registrations are made in the BLOCKCHAIN database with an IDENTITY specification which is known to be compromised. In another preferred embodiment, it is avoided that registrations are made for file hashes for which a registration has already taken place, or certain permissions are required to make new registrations for files for which the file hash is already known to the BLOCKCHAIN.

EXAMPLE 2

Method and System for Recording a Validity of a Location Reference

For specified location references, it can be important to obtain additional certainty as to the validity of the specified locations. This can be ensured by additionally having signed hash-related strings by one or more validating parties.

This is moreover comparable to the strength of Blockchain itself, in which a lot of nodes work together to deliver a "proof of work" leading to a new block. In blockchain, this "proof of work" consists of calculating a hash. With the method for validation, additional work is added to the "proof of work". In this way, it is avoided that a central entity should download all files for which locations are recorded and should calculate the file hash for all of these files. A similar central authority should have to work too much in terms of CPU and bandwidth. In a preferred embodiment, the validation is therefore handled in a decentralized way, in which it is avoided that each node must test each file. The latter could indeed overload the server hosting a file. Preferably, sufficient validation is however provided, with for example at least three validating parties.

In the following specific example, the following notation is used:
N: number of validating parties
O: the owner (owner/user) of the file
Opub: the public certificate of the public/private key pair of O
D: the complete file, preferably a document
ID: the ID of the file corresponding to a metadata field
L: the location, i.e. a list of location alternatives of the file
H: the file hash, calculated by O
HsO: the hash of the file, signed with the private key of O Opub, L and HsO are provided at the blockchain, possibly with ID, in which in step (c) it is possibly checked if the ID is unique with respect to the blockchain.

Before ID, Opub, L and HsO end up in a block of the blockchain, a request for verification is sent to one or more nodes in the blockchain.

V1: the first verifier

V1 takes HsO and by means of Opub V1 realizes the conversion from HsO to H. V1 takes L and downloads all copies of the D. Of each download, a file hash Hx is made. If Hx for each location in L is equal to H, then V1 signs HsO with its private key. This results in HsOsV1.

This can be repeated a number of times, in which the following information is then saved in a blockchain block: ID, L, HsOsV1sV2 . . . sVN, Opub, V1pub, V2pub, . . . Vnpub Visitors who try to have access to the file and are only interested to find a copy of D based on ID, only have to look at L. Those wishing additional guarantees, can convert the hash HsOsV1sV2 . . . sVN that has been signed several times into H, by means of Opub, V1pub, V2pub, . . . VNpub. This H allows to check if D is effectively the registered file. The Opub allows to retrieve the identity of the user/owner. V1pub, V2pub, . . . Vnpub give the identity of all validating parties that have been chosen arbitrarily.

It will be understood that the present invention is not limited to the embodiments described above and that some adjustments or changes can be added to the described examples without changing the scope of the enclosed claims. The present invention has for example been described with reference to a separate blockchain destined for the recording of the location of a general file, but it will be clear that the invention can be applied with a blockchain that is acquainted with another use, such as for example the bitcoin blockchain. Diverse formats for the file are also mentioned, such as PDF-based files, but actually, any kind of file format can be used. It can for example be a format for word processing or word display, but it can also be an image (either pixel based, or vector based), a media file such as an audio fragment or a film fragment, a JSON file (JavaScript Object Notation), or a specialized file format such as for example a computer aided design (CAD) file.

The invention claimed is:

1. Computer-implemented method for recording a location of a file by a user in a blockchain; said location comprising one or more location alternatives; said method comprising the following steps:
   (a) receiving, from said user, at least said file and said location;
   (b) calculating, by means of a cryptographic hash function, a file hash based on said file;
   (c) evaluating a uniqueness of said file hash and/or said location and/or a further characteristic with respect to the blockchain, in which a non-uniqueness leads to a corresponding action;
   (d) composing a location reference comprising said location and said file hash;
   (e) registering said location reference in said blockchain;

wherein said location reference composed in step (d) further comprises a signed hash-related string; in that step (d) comprises the composing of a hash-related string based on said file hash; in that step (d) comprises the encryption of said hash-related string by means of a private key belonging to a key pair belonging to said user for obtaining said signed hash-related string, said key pair including said private key and a public key; in that said location reference comprises a user identity for retrieving said public key; and in that said location comprises a location alternative concerning a URL.

2. Method of claim 1, wherein said location comprises several different location alternatives, in which each of said several location alternatives comprises a corresponding URL.

3. Method of claim 1, wherein said hash-related string composed in step (d) concerns the file hash.

4. Method of claim 1, wherein said hash-related string composed in step (d) is composed based on both the file hash and based on a portion of further data, in which said portion of further data is determined by the file and/or the location and/or an earlier version of the file, and in which said hash-related string comprises a concatenation of said file hash and said portion of further data.

5. Method of claim 1, wherein said location comprises a location alternative concerning a URL providing a visitor with access to the file if said visitor disposes of a permission to consult said file.

6. Method of claim 1, wherein said method comprises step (c) comprising the evaluation of the uniqueness of said location with respect to the blockchain; in which the non-uniqueness leads to a corresponding action comprising a testing of said location.

7. Method of claim 1, wherein said file comprises a metadata field; in which said method comprises step (c) comprising the evaluation of a uniqueness of said file hash with respect to the blockchain; in which the non-uniqueness leads to a corresponding action comprising adapting said metadata field and resuming the method as from step (b) with a resulting changed file for obtaining a changed file hash that is unique with respect to said blockchain.

8. Method of claim 1, wherein said file comprises a metadata field; in which said method comprises step (c) comprising the evaluation of the uniqueness of another characteristic with respect to the blockchain, said further characteristic concerning said metadata field; in which the non-uniqueness leads to a corresponding action comprising adapting said metadata field and resuming the method as from step (b) with a resulting changed file for obtaining a changed metadata field that is unique with respect to said blockchain, and in which said location reference composed in step (d) comprises said metadata field.

9. Method of claim 8, wherein said file relates to a PDF-based document, in which said metadata field relates to a file ID pair comprising of a first ID and a second ID; in which said file ID pair concerns an ID array corresponding to ISO 32000-1 and/or ISO 32000-2 comprising a first byte string concerning a first file identifier and a second byte string concerning a second file identifier, in which said ID array is not encrypted independent of the fact whether or not a portion of said file has been encrypted; in which said first ID concerns a permanent ID for identifying an original version of said file; in which said second ID concerns a changing ID for identifying an adapted version of said file; in which said evaluation in step (c) relates to the uniqueness of said file ID pair with respect to the blockchain, in which the not-uniqueness leads to a corresponding action comprising adapting said second ID and resuming the method as from step (b) with a resulting changed file for obtaining a changed file ID pair that is unique with respect to said blockchain; and in that said location reference composed in step (d) comprises said file ID pair.

10. Computer-implemented method for confirming a validity of a location reference recorded with the method of claim 1 by a validating party, said method comprising the steps:
(A) receiving a location reference of a file, said location reference comprising a location, a signed hash-related string that has been signed by a user, a user identity with respect to said user, and a file hash, said location comprising one or more location alternatives, said signed hash-related string being constructed based on at least said file hash and further based on said location;
(B) processing said user identity for retrieving a public key belonging to a key pair belonging to said user;
(C) decrypting said signed hash-related string with said public key that has been obtained in step (B), resulting in a decrypted hash-related string;
(D) evaluating a validity of said decrypted hash-related string that has been obtained in step (C) with respect to said file hash that has been received in step (A);
(E) retrieving a copy of said file for each of said one or more location alternatives;
(F) calculating a file hash for each copy that has been retrieved in step (C);
(G) evaluating a being equal of the file hash that has been received in step (A) and each file hash that has been calculated in step (F);
in which said confirmation of said validity takes place if said evaluation in step (G) is positive, and if said evaluation in step (D) and step (G) are both positive.

11. Method of claim 10, wherein said method comprises the following further steps:
(H) if said evaluation in step (G) is positive, and if said evaluation in step (D) and step (G) are both positive, composing a location reference ready for validation comprising at least said location, said signed hash-related string that has been signed by the user, said file hash and a validating party identity for retrieving said validating party public key;
(I) signing by said validating party of said location reference that is ready for validation, for obtaining a validating location reference;
(J) adding said location reference of said user to said validating location reference if not yet included in said validating location reference;
(K) registering said validating location reference in said blockchain;
in which said signing in step (I) comprises encrypting a validating string with a public key of a validating party that belongs to a validating party key pair of a validating party, and in which said validating string comprises at least said hash-related string that has been signed by the user.

12. Method of claim 1, wherein said registration takes place in step (e) provided that at least said user identity and furthermore an identity of the validating party belongs to a plurality of user identities that have been registered in a web-of-trust or at a Certificate Authority.

13. System for recording a location of a file by a plurality of users, said system comprising a plurality of mutually linked devices, each of the devices comprising a processor, tangible non-volatile memory, instructions in said memory for controlling said processor, a client application, in which for each device, the client application is configured for carrying out a method of claim 1, in which a user identity for retrieving a public key for at least one of the users is linked one-to-one to the client application on the device belonging to said user.

14. System of claim 13, wherein at least one of said plurality of devices comprises a hardware security module and/or smart card and/or USB token.

15. System of claim 13, wherein a registration of a location reference in a blockchain takes place provided that said user identity belongs to a plurality of user identities that have been registered in a web-of-trust or at a certificate authority; and that the fact that the user identity linked to the client application is compromised, leads to a removal of said compromised user identity from said plurality of user identities that have been registered in said web-of-trust.

16. Use of a blockchain comprising using a plurality of location references recorded with all of the steps of the method of claim 1, and recorded by a system for recording a location of a file by a plurality of users as file location index, said system comprising a plurality of mutually linked devices, each of the devices comprising a processor, tangible non-volatile memory, instructions in said memory for controlling said processor, a client application, in which for each device, the client application is configured for carrying out a method of claim 1, in which a user identity for retrieving a public key for at least one of the users is linked one-to-one to the client application on the device belonging to said user, in which a search query comprising a file hash and/or a metadata field and/or a first ID belonging to said metadata field and/or a second ID belonging to said metadata field results in the search of said plurality of location references that have been saved in the blockchain, resulting in a provision of a location reference recorded in the blockchain associated with said search, a location reference that has been recorded most recently in the blockchain associated with said search query.

17. Use of a blockchain comprising a plurality of location references recorded with the method of claim 1, and recorded by a system for recording a location of a file by a plurality of users as a link index, said system comprising a plurality of mutually linked devices, each of the devices comprising a processor, tangible non-volatile memory, instructions in said memory for controlling said processor, a client application, in which for each device, the client application is configured for carrying out a method of claim 1, in which a user identity for retrieving a public key for at least one of the users is linked one-to-one to the client application on the device belonging to said user in which a search query comprising a location concerning a URL to scan results in the searching of said plurality of location references that have been saved in the blockchain, resulting in a provision of an indication of the fact whether or not said link has been registered in the blockchain and/or file-related information based on a location reference related to said location and/or validation-related information based on a validating location reference related to said location.

18. Use of a blockchain comprising a plurality of location references recorded with the method of claim 1 and recorded by a system as an event trigger, said system comprising a plurality of mutually linked devices, each of the devices comprising a processor, tangible non-volatile memory, instructions in said memory for controlling said processor, a client application, in which for each device, the client application is configured for carrying out a method of claim 1, in which a user identity for retrieving a public key for at least one of the users is linked one-to-one to the client application on the device belonging to said user in which an event relating to the recording of a location reference meeting one or more filtering criteria related to a user, a location, a file hash and/or a metadata field of a file forms a trigger for generating a notification related to said event.

19. Computer program product for carrying out a computer-implemented method of claim 1 in a system for recording a location of a file by a plurality of users, said system comprising a plurality of mutually linked devices, each of the devices comprising a processor, tangible non-volatile memory, instructions in said memory for controlling said processor, a client application, in which for each device, the client application is configured for carrying out the steps of claim 1, in which a user identity for retrieving a public key for at least one of the users is linked one-to-one to the client application on the device belonging to said user, which computer program product comprises at least one non transitory computer readable medium in which computer-readable program code portions are saved, which program code portions comprise instructions for carrying out said method.

* * * * *